2,868,660

INTERIOR PLASTER

Edward M. Lemmon, Franklin Township, Franklin County, Ohio, assignor to James L. Palsgrove, Columbus, Ohio No Drawing. Application April 15, 1957
Serial No. 652,685

4 Claims. (Cl. 106—109)

The invention illustrated in this application relates to interior plaster compositions of matter which are suitable for use as finish plasters.

It has heretofore been a normal practice in plastering to apply first a ground coat and then to wait for several days for this to dry, and then to apply a finish coat; then after the finish coat has dried to paint the finished surface. This occasions the delay of from several days to a week before the plaster is finished and the walls have been painted.

It has been heretofore proposed to mix color with a finish plaster coat so as to eliminate the painting step. However, it has been found that with conventional mixes the trowelling of the finish coat (with water as is necessary) pulls the color from the mix and makes unsightly streaks.

It is an object of my invention to produce a cement plaster composition which is preeminently suited to use as a finish plaster coating for interior walls and ceilings of buildings.

It is a further object of my invention to produce such a finish plaster composition which may be used over the ground coat plaster relatively quickly after the ground coat has been applied. Thus, a ground coat may be applied to a wall one one day and the finish coat of my composition may be applied the next day, thereby saving several days in finishing the wall.

It is a further object of my invention to provide such a finish plaster composition which is already colored and does not require painting. By using a finish coat with a paint included, not only is the labor of painting saved but many days of waiting are avoided.

It is a further object of my invention to provide such a finish plaster composition which may be applied easily, does not streak, has a sand finish, dries relatively quickly, wears well and is superior to other finish plasters of which I have knowledge.

Further objects and features of my invention will be apparent from a reading of the following specification and claims.

My composition consists of a mixture of ground marble aggregate (ground to the size of fine sand), lime, Keene cement, zinc stearate, and color. If a white finish is desired the color is omitted. In preparing this composition I prefer to use the ingredients in about the following proportions:

|  | Percent |
|---|---|
| Marble aggregate | About 60 |
| Lime (hydrated) | About 27 |
| Keene cement (gypsum) | About 12 |
| Zinc stearate | About 0.5–00.3 |
| Color | About 0.2–0.02 |

In the above composition the proportions may be varied reasonably, as suggested in the examples below, although the proportions of the marble aggregate, lime, Keene cement and zinc stearate given are those which I have found to be most satisfactory. The marble aggregate gives body or filler, the lime gives workability, the Keene cement gives hardness and the zinc stearate gives water resistance. The amounts of color added varies relatively widely depending on the kind and depth of color desired.

Ingredients are thoroughly mixed (preferably in a mechanical mixer) and then sacked ready for use. When ready for immediate use, the contents of the sack are mixed with a quantity of water sufficient to render the contents of the desired consistency for plastering. For instance, one 50 lb. sack is mixed with about 2⅓ gallons of water to form a plaster which is then ready for use, and which can be applied to the plaster undercoat very soon (about one day) after the undercoat has been applied. Such finish coating is water resistant and therefore washable. It dries quickly and does not require painting inasmuch as the color has been added previously. It may be applied smoothly without excessive trowelling to give a smooth sand finish. The plaster does not chip-crack, or fire-crack, is hard and retains a fine sand finish.

Following are satisfactory examples of my finish plaster composition:

*Example I*

1000 lbs. marble aggregate (ground to the size of fine sand)
450 lbs. hydrated lime
200 lbs. Keene cement
5 lbs. zinc stearate
3 lbs. of blue coloring This composition gives a blue colored plaster.

*Example II*

1000 lbs. marble aggregate
400 lbs. hydrated lime
200 lbs. Keene cement
4 lbs. zinc stearate
1½ lbs. blue coloring This composition gives a pastel blue tinted plaster.

*Example III*

1000 lbs. marble aggregate
500 lbs. hydrated lime
200 lbs. Keene cement
6 lbs. zinc stearate
8 oz. black coloring This composition gives a silver gray colored plaster.

*Example IV*

900 lbs. marble aggregate
400 lbs. hydrated lime
180 lbs. Keene cement
5 lbs. zinc stearate
5 lbs. green coloring This composition gives a green colored plaster.

*Example V*

1050 lbs. marble aggregate
450 lbs. hydrated lime
200 lbs. Keene cement
5 lbs. zinc stearate
3 lbs. brown coloring
2 lbs. yellow coloring
1 lb. burnt amber This composition gives a light tan or buff colored plaster.

Example VI 1000 lbs. marble aggregate
450 lbs. hydrated lime
180 lbs. Keene cement
5 lbs. zinc stearate
5 lbs. yellow coloring
1 lb. red coloring This composition gives a cream colored plaster.

Example VII 1050 lbs. marble aggregate
500 lbs. hydrated lime
210 lbs. Keene cement
5½ lbs. zinc stearate
2¼ lbs. red coloring This composition gives a pink tinted plaster.

Many other colored plasters may be produced by using other kinds of color in the basic mix.

Example VIII 1000 lbs. marble aggregate
450 lbs. hydrated lime
200 lbs. Keene cement
5 lbs. zinc stearate This composition gives a white plaster.

It is to be understood that the above described embodiments of my invention are for the purpose of illustration only and various changes may be made therein without departing from the spirit and scope of the invention.

I claim:

1. A composition of matter consisting of about 60% marble aggregate ground to the size of fine sand, about 27% of hydrated lime, about 12% of Keene cement, about ⅓ of 1% zinc stearate, and about ⅕ of 1% of color.

2. A composition of matter which comprises the following ingredients in substantially the following proportions: 1050 lbs. marble aggregate ground to the size of fine sand, 450 lbs. of hydrated lime, 200 lbs. of Keene cement, 4–6 lbs. of zinc stearate and 8 oz. to 8 lbs. of color.

3. A composition of matter consisting of about 60% marble aggregate ground to the size of fine sand, about 27% of hydrated lime, about 12% of Keene cement, and about ⅓ of 1% zinc stearate.

4. A composition of matter which comprises the following ingredients in substantially the following proportions: 1050 lbs. marble aggregate ground to the size of fine sand, 450 lbs. of hydrated lime, 200 lbs. of Keene cement, and 4–6 lbs. of zinc stearate.

References Cited in the file of this patent

UNITED STATES PATENTS

| Number | Name | Date |
|---|---|---|
| 825,870 | Schirra | July 10, 1906 |
| 2,000,371 | Bauer | May 7, 1935 |
| 2,049,882 | Witty | Aug. 4, 1936 |
| 2,197,566 | Denning | Apr. 16, 1940 |